May 3, 1960

A. L. FROST 2,935,718

ELECTRIC MATCH ASSEMBLY

Original Filed Feb. 11, 1954

INVENTOR
ARTHUR L. FROST
BY Howson & Howson
ATTYS.

United States Patent Office 2,935,718
Patented May 3, 1960

2,935,718
ELECTRIC MATCH ASSEMBLY

Arthur L. Frost, Wilmington, Del., assignor to Atlas Powder Company, Wilmington, Del., a corporation of Delaware Original application February 11, 1954, Serial No. 409,749, now Patent No. 2,782,492, dated February 26, 1957. Divided and this application September 19, 1956, Serial No. 613,802

9 Claims.  (Cl. 338—329)

The present invention relates to a novel assembly wherein fine, high resistance wires are bonded to copper or copper alloys, especially brass; and, more particularly, it relates to an electric match assembly wherein a Nichrome or tungsten bridge wire to the brass tabs. This application is a division of co-pending application S.N. 409,749 filed February 11, 1954, now Patent No. 2,782,492.

In blasting art it is common to initiate combustible or explosive material such as in an electrically initiated blasting cap, squib, pressure generating cartridge, and the like, by means of an electric match. The electric match generally comprises two brass strips, termed "tabs," separated by a non-conducting material, and a fine wire, termed the bridge wire, of high resistance metal, usually Nichrome or tungsten, electrically connecting the two tips of the tabs at one end thereof. The bridge wire between the two tabs is covered with a combustible material—usually referred to as the match composition—so that when an electric current is caused to flow through the tabs and across the high resistance bridge wire, the heat generated in the bridge wire will cause the combustible material to ignite, thereby initiating the detonating or other material in the device.

It has been the practice for some time to secure the bridge wire to the brass tabs by soldering. This method has often not provided a secure and stable fastening because of the difficulty in making the solder join with the bridge wire. The difficulty is accentuated by the limitation in the kinds of flux which may be used to those which will not adversely affect the stability and functioning of the match. The product frequently lacks uniformity and its performance characteristics are erratic and thus the number of rejects is relatively high. Furthermore the operation of soldering is laborious and time consuming and causes a need for additional material and labor to remove or neutralize the flux as much as is possible.

Previous attempts to weld the bridge wire to the brass tabs have not proven successful because of the inability to weld the Nichrome or tungsten wire satisfactorily directly to the brass. In the welding process there is either an expulsion of the molten brass away from the weld area leaving a void or there is a softening of the brass permitting the wire merely to imbed itself in the brass. The high temperatures involved have also resulted in embrittlement of the wire.

What has been said above also applies in large measure to the joining of the high resistance bridge wire to the copper lead wires of bridge-plug type initiators, and it will be apparent that the present invention is also applicable to the bonding of the bridge wire to the lead wires in such device.

It is the principal object of the present invention to provide an assembly wherein fine, high resistance wire is bonded to brass, and other copper-containing metals and alloys, wherein the previous difficulties and excessive costs are not encountered.

Another object of the invention is to provide a novel assembly comprising a fine, high resistance bridge wire, such as a Nichrome or tungsten wire, bonded by a weld to copper or a predominantly copper alloy such as brass, bronze or the like.

A further object of the invention is to provide a novel electric match assembly comprising a Nichrome or tungsten bridge wire welded to a pair of brass match tabs.

Other objects will become apparent from a consideration of the following specification and claims.

As pointed out above, the present invention is applicable to the bonding of high resistance wires to copper and copper alloys, the major constituent of which is copper, such as brass, bronze and the like. Since, however, the metal to which such wire will most usually be bonded is brass, the invention will be described with emphasis on the use of brass.

In accordance with the present invention the fine, high resistance wire is laid on the brass surface to which it is desired to bond the resistance wire. Then a second, fine wire of a nickel-containing alloy selected from the group consisting of nickel-zinc-copper and nickel-cobalt-iron alloys is laid on top of the high resistance wire so as to cross or intersect the high resistance wire, at an angle, over the desired area of bonding. A current is then passed transversely through the nickel alloy wire, the high resistance wire and the brass at the point of intersection generating heat in the high resistance wire sufficient to fuse the nickel alloy wire at the area adjacent the intersection, whereby the nickel alloy fuses to the high resistance wire and to the brass and makes a weld between them.

Specifically, in the preparation of an electric match in accordance with the present invention, the match tabs already having been assembled from two thin strips of brass electrically insulated by means of a layer of dielectric material sandwiched between the brass strips and bonded thereto, the high resistance bridge wire is laid on at least one of the brass tabs in a generally longitudinal direction so as to contact the brass strip near one end thereof (the proposed match head end) and as to extend over the stated end. The nickel alloy wire is then laid upon the high resistance wire at an angle thereto so as to cross it at a point near the stated end of the match tab assembly. Current is then passed transversely through the assembly in the manner discussed above to cause welding of the nickel-containing wire to the high resistance wire and to the brass assembly thereby securely locking the high resistance wire in place. Either simultaneously or at a different time the end of the high resistance wire extending over the gap may be made to contact the outer surface of the other brass tab near the proposed match head end, a nickel alloy wire placed thereover at an angle so as to cross the high resistance wire at a point near the stated end of the match tab assembly and current passed transversely therethrough to cause bonding of the high resistance wire to the other brass tab.

The product of the present invention, therefore, comprises a fine, high resistance wire, preferably selected from the group consisting of fine Nichrome and tungsten wires, directly in contact with a copper, brass, or other copper alloy surface and mechanically held thereto by means of a weld between the stated fused nickel alloy wire and the high resistance wire and copper or copper alloy respectively.

The present invention may be more readily understood from a consideration of the accompanying drawings wherein.

Figure 1:
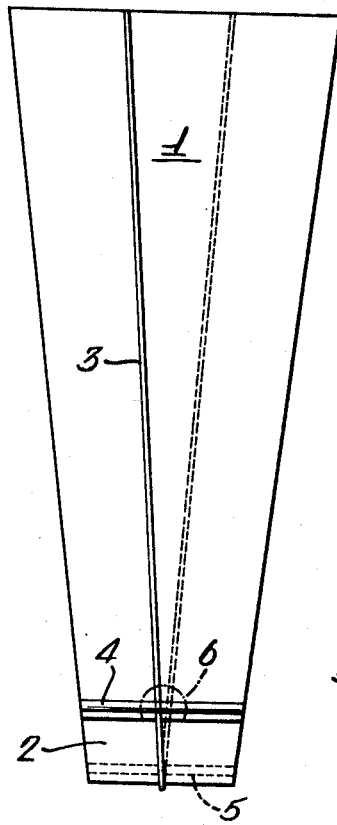
Figure 1 represents a front elevational view of an electric match assembly at one stage of its preparation.

In the manufacture of electric matches the bridge wire is normally a very fine wire which possesses a high electrical resistance. The materials most usually employed for this purpose are tungsten and Nichrome wires because of their fineness and because of their high electrical resistance. Nichrome wires generally are composed essentially of nickel and chromium containing between about 75 and about 85% of nickel and between about 15% and about 25% chromium. The preferred Nichrome wire will contain about 80% of nickel and about 20% of chromium. As stated, the bridge wire is very fine, and usually the diameter thereof will not exceed about .002 inch, although in certain types of matches the diameter may range as high as about .003 inch. The preferred bridge wire will be about .0015 inch in diameter for Nichrome and about .0005 inch for tungsten.

The brass of the tabs of the electric match is generally one which contains between about 65% and about 75% of copper and between about 25% and about 35% of zinc. Included within this range are spring brass, cartridge brass, commercial high brass, and the like. The preferred brass for the manufacture of electric matches is spring brass which contains about 70% copper and about 30% zinc. The brass tabs are generally relatively thin, the thickness of each tab strip being on the order of about .004 inch.

In the electric match, the two brass tabs are in the form of thin strips separated by a layer of dielectric material, such as resin impregnated paper, vulcanized fiber paper, and the like, sandwiched between the brass strips and securely bonded thereto. At one end of the laminated assembly there is preferably provided a gap which is to be spanned by the bridge wire. This gap may be provided by extending one of the brass tabs further than the other tab, as illustrated in the drawings; by providing a groove between the forward edges of the tabs, or by an arc or loop of bridgewire extending beyond the tabs.

Bonding of the high resistance wire to the brass surface is accomplished, in accordance with the present invention, by the use of a material, in fine wire form, that will fuse by virtue of the heat generated in the high resistance wire upon the flow of an electric current therethrough as discussed previously. The material must be such as will rapidly conduct heat away from the hot high resistance wire so that the high resistance wire does not become heated to the point of embrittlement. It must also be such as will fuse by virtue of the heat rapidly conducted away from the high resistance wire, and it must rapidly and firmly weld not only to the high resistance wire but also to the brass of the brass tab and thereby permanently join them together. Fine wires of certain nickel-containing alloys have been found to be ideally suited for this purpose. One type of nickel-containing alloys are the well known "nickel silver" alloys, that is, nickel-zinc-copper alloys, particularly those which contain between about 10% and about 30% of nickel, between about 13% and about 33% of zinc and between about 50 and about 57% of copper. Preferably, the nickel-zinc-copper alloy selected will be one having a relatively high, such as at least about 15%, nickel content. Nickel silvers which have been found to be particularly applicable in wire form are those containing about 18% nickel, about 27% zinc and about 55% copper, and about 30% nickel, about 14% zinc and about 56% copper, respectively. Another nickel-containing alloy in wire form which has been found to be especially suited for the intended purpose is that containing nickel, cobalt and iron, particularly those in which the nickel makes up between about 24% and about 34%, the cobalt between about 5 and about 25% and the iron between about 41% and about 72%. An especially advantageous alloy in this connection is that containing between about 28% and about 30% of nickel, between about 17% and about 18% of cobalt and between about 52% and about 54% of iron sold under the trade name of Kovar by the Stupakoff Ceramic and Manufacturing Company. Such nickel-cobalt-iron alloy wire is preferred. The nickel-containing alloy employed in accordance with the present invention will be, as stated, in the form of a fine wire. Generally the diameter of the wire will be between about .0025 and about .010 inch, a wire having a diameter of approximately .005 inch being particularly advantageous.

Referring further to the drawings, in Figure 1, 1 represents the top brass tab and 2 represents a layer of non-conducting material separating top brass tab 1 from the bottom brass tab (not seen in this particular figure). The non-conducting layer 2 is bonded directly to top brass tab 1 and to the bottom brass tab. The bottom brass tab, overlaid with a layer of non-conducting material 2, extends beyond top brass tab 1 providing a step-like structure to serve as a gap. 3 is the high resistance bridge wire which is laid generally longitudinally of the match in contact with the top brass tab 1 and extending beyond top brass tab 1 for contact with the bottom brass tab. Although it is preferred that the bridge wire 3 be positioned substantially in the center of the match, at the gap end thereof, this is not necessary. 4 represents the nickel-containing alloy wire which is laid across bridge wire 3 at a point adjacent the gap end of top tab 1 and generally represented by dotted area 6, corresponding to the desired weld area. 5 represents another nickel-containing alloy wire which will serve to weld bridge wire 3 to the surface of the bottom brass tab.

Figure 2:
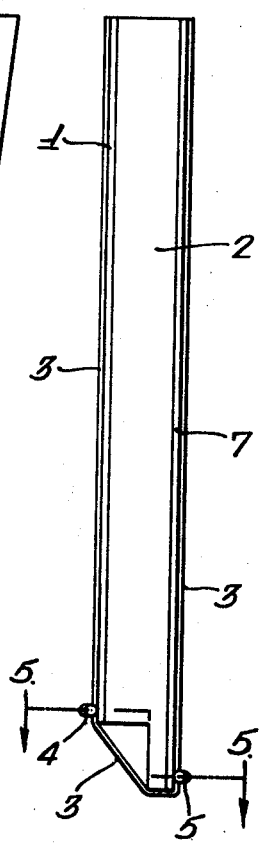
Figure 2 represents a side elevational view of the assembly shown in Figure 1.

In Figure 2, 1 represents the top brass tab, 2 represents the intermediate separating layer of non-conducting material 3 represents the bridge wire and 4 represents the nickel-containing alloy wire for welding bridge wire 3 to top brass tab 1. 5 represents the nickel-containing alloy wire for welding bridge wire 3 to the bottom brass tab 7.

Figure 3:
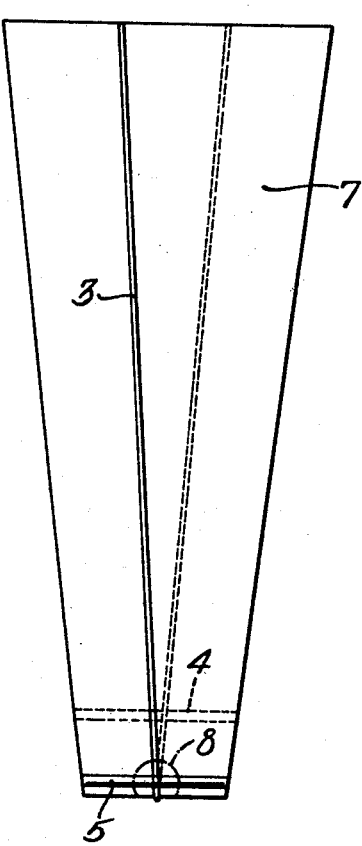
Figure 3 represents a rear elevational view of the electric match assembly before welding.

With respect to Figure 3, in this figure 7 represents the bottom brass tab, 3 represents the high resistance bridge wire and 5 represents the nickel-containing alloy wire for welding bridge wire 3 to bottom brass tab 7. 4 is the nickel-containing alloy wire serving to bond bridge wire 3 to the top brass tab not shown in this figure. As shown in Figure 3, bridge wire 3 is laid in contact with bottom brass tab 7, generally longitudinally thereof and positioned approximately in the center thereof at the gap end. Nickel-containing alloy wire 5 is laid across the high resistance alloy wire 3, at an angle thereto, intersecting wire 3 at a point adjacent the gap end of bottom tab 7 and generally represented by dotted area 8 corresponding to the desired weld area.

Figure 4:
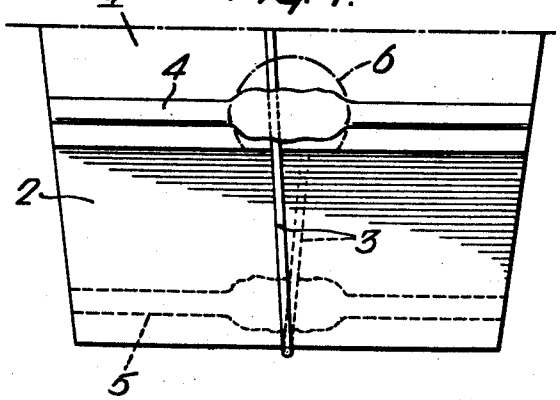
Figure 4 represents a front elevational view of the bottom portion of the assembly shown in Figure 1 after welding.

Figure 4 is an elevational view showing the lower end of the assembly after welding. As the result of passing an electric current transversely through wire 4, bridge wire 3 and brass tab 1 at the point where wire 4 crosses bridge wire 3, nickel-containing alloy wire 4, at and adjacent the point of crossing, has fused, spreading and flowing down around high resistance wire 3 welding thereto and to top brass tab 1. Likewise, nickel-containing alloy wire 5 has been caused to fuse to bond bridge wire 3 to the bottom brass tab in the same manner.

Figure 5:
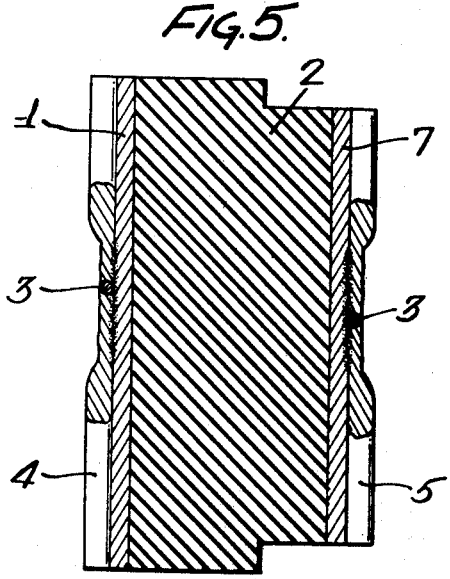
Figure 5 is a transverse sectional view on line 5—5 of Figure 2.

Figure 5, a transverse sectional view taken on line 5—5 of Figure 2, shows bridge wire 3 securely bonded to top brass tab 1 and to bottom brass tab 7 by means of the weld between fused nickel-containing alloy wire 4 and bridge wire 3 and top brass tab 1, and the weld between fused nickel-containing alloy 5 and bridge wire 3 and brass tab 7, respectively. As is seen in Figure 5, the fused nickel alloy wire flows down around both sides of the bridge wire so that, in the final bonded product, the nickel alloy substantially surrounds the bridge wire except for the part of the bridge wire directly in contact with the brass surface. By welding to the major portion of the periphery of the bridge wire at the bonding area and to the brass on both sides of the bridge wire, as shown in Figure 4, a very secure bond is provided by the nickel alloy.

As shown in Figures 1, 3 and 4, the bridge wire does not lie exactly on the longitudinal center line of the match assembly but rather at a slight angle thereto. This illustrates the relative position of the bridge wire during assembly when, in accordance with one manner of making the match assemblies, each match body is actually one of several on a two-edge blank or comb and the bridge wire is wound spirally around the blank or comb, one-half of one spiral being shown in the drawings.

It is apparent from the foregoing and from a consideration of the drawings that the angle described by the crossing of the nickel alloy wire with the high resistance wire is not critical so long as the former crosses the latter. From the standpoint of ease of manufacture, however, the nickel alloy wire will generally cross the high resistance wire at an angle of from about 75 to about 90°.

Following the bonding of the high resistance bridge wire to both brass tabs of the electric match assembly, excess high resistance wire extending beyond the weld in a direction away from the bridge may be cut and disposed of. Likewise, excess nickel-containing alloy wire extending beyond both sides of the weld area may be sheared off. The combustible match head composition may then be applied around the bridge wire where it spans the gap between the brass tabs. The application of this material to the bridge wire may follow conventional procedure and forms no part of the present invention.

The present invention may be more readily understood from a consideration of the following specific example which is given for the purpose of illustration only and is not intended to limit the scope of the invention in any way:

*Example*

The match tab assembly is prepared in which a strip of vulcanized paper approximately .04 inch thick is sandwiched between two spring brass strips each of which is about .004 inch thick. The brass strips are securely bonded to the vulcanized paper separating them. One strip, termed herein the bottom brass tab, with a thin layer of vulcanized paper adhered thereto is permitted to extend beyond the end of the other brass tab by about 1/32 inch.

A .0015 inch diameter Nichrome wire (80% nickel and 20% chromium) is looped over the end of the tabs to form a bridge electrically connecting the two ends of the brass tabs. The Nichrome wire is held in place by suitable means.

A .005 inch diameter nickel alloy wire (about 29% nickel, about 18% cobalt and about 53% iron—sold under the name of Kovar "A") is then laid across the Nichrome wire near the end of the top brass tab, crossing the Nichrome wire at approximately 80–90°. A Mallory No. 100 welding electrode is then placed over the assembly in contact with the nickel alloy wire and directly above the point of intersection with the Nichrome wire and a Mallory No. 3 welding electrode is placed in contact with the surface of the brass making a complete series circuit. Care is taken that the electrode does not exert sufficient pressure against the assembly as to imbed the Nichrome wire into the brass, since the current during welding should pass through the entire diameter of the high resistance wire for optimum welding. A direct current of approximately 780 volts is applied for .003 second using a capacitor type welding unit. This is sufficient to cause fusing and flowing of the nickel-containing alloy wire down about the Nichrome wire where it becomes welded to both the Nichrome wire and the top brass tab.

Similarly, a nickel-containing alloy wire of the same type is laid across the Nichrome wire contacting the bottom brass tab near the end of the bottom brass tab and intersecting the Nichrome wire at approximately an 80–90° angle. The Nichrome wire is welded to the bottom brass tab in the same manner as discussed above.

Loose ends of all wires are then sheared away, leaving an electric match assembly having a Nichrome bridge wire securely bonded to both brass tabs. The usual match composition may then be applied to the bridge wire.

By the foregoing procedure a secure and stable fastening of the bridge wire to the brass tabs is obtained and without any evidence of brittleness of the bridge wire.

To determine the relative stability of the match assembly, the electrical resistance of several hundred of newly made matches with welded bridges was measured as was the resistance of several hundred newly prepared soldered matches. The matches were then stored for two months, and the electrical resistance measured again at the end of each month. With the matches of the present invention about 80% thereof had resistances agreeing with ±0.05 ohm with the original resistances after the first and second month. However, with soldered matches, after one month's storage, only about half had resistances within ±0.05 ohm of the original resistances and after the second month only about 10% had resistances agreeing within ±0.05 ohm of the original resistances.

Considerable modification is possible in the selection of the various materials employed in making the assembly of the present invention as well as in the exact procedure employed without departing from the scope of the present invention.

I claim:

1. An article of manufacture comprising a metal body selected from the group consisting of copper and copper alloys and a fine, high resistance wire directly in contact with said metal and bonded thereto by means of a weld between a nickel alloy selected from the group consisting of nickel-zinc-copper alloys and nickel-cobalt-iron alloys and the high resistance wire and the metal body respectively.

2. An article of manufacture comprising a brass body and a fine, high resistance wire directly in contact with said brass and bonded thereto by means of a weld between a body of a nickel alloy selected from the group consisting of nickel-zinc-copper alloys containing between about 10 and about 30% nickel, between about 13 and about 33% zinc and between about 50 and about 57% copper and nickel-cobalt-iron alloys containing between about 24 and about 34% nickel, between about 5 and about 25% cobalt and between about 41% and about 72% iron and the high resistance wire and the brass body respectively.

3. The article of claim 2 wherein the nickel alloy selected is a nickel-cobalt-iron alloy containing between about 28 and about 30% nickel, between about 17 and about 18% cobalt and between about 52 and about 54% iron.

4. The article of claim 2 wherein the brass body has a composition of between about 65 and 75% of copper and between about 25 and 35% of zinc; and wherein the high-resistance wire is tungsten.

5. The article of claim 2 wherein the brass body has a composition of between about 65 and 75% of copper and between about 25 and 35% of zinc; and wherein the high-resistance wire has a composition of between about 75 and about 85% of nickel and between about 15 and about 25% of chromium.

6. An electric match assembly comprising a pair of brass tabs separated by a layer of dielectric material and securely bonded thereto and a high resistance bridge wire selected from the group consisting of Nichrome and tungsten bridge wires electrically connecting said tabs over one end of said tab assembly and attached to each of the tabs by means of a weld between a body of a nickel alloy selected from the group consisting of nickel-zinc-copper alloys containing between about 10 and about 30% nickel, between about 13 and about 33% zinc and between about 50 and about 57% copper and nickel-cobalt-iron alloys containing between about 24 and about 34% nickel, between about 5 and about 25% cobalt and between about 41% and about 72% iron and the bridge wire and brass tabs respectively.

7. The electric match assembly of claim 6 wherein said bridge wire is a Nichrome wire and wherein the nickel alloy selected is a nickel-cobalt-iron alloy containing between about 28 and about 30% nickel, between about 17 and about 18% cobalt and between about 52 and about 54% iron.

8. The article of claim 4 wherein the brass body has a composition of about 70% copper and about 30% zinc.

9. The article of claim 5 wherein the brass body has a composition of about 70% of copper and about 30% of zinc; and wherein the high resistance wire has a composition of about 80% of nickel and about 20% of chromium.

References Cited in the file of this patent

UNITED STATES PATENTS

| | | |
|---|---|---|
| 1,715,543 | Elmen | June 4, 1929 |
| 2,406,383 | Kindermann | Aug. 27, 1946 |
| 2,782,492 | Frost | Feb. 26, 1957 |

OTHER REFERENCES

American—American Brass Co. advertisement on the cover of Machine Design Magazine of February 1947.